Nov. 11, 1969   R. E. AUMANN   3,477,143
ELECTRICAL TEACHING SYSTEM
Filed Dec. 6, 1967
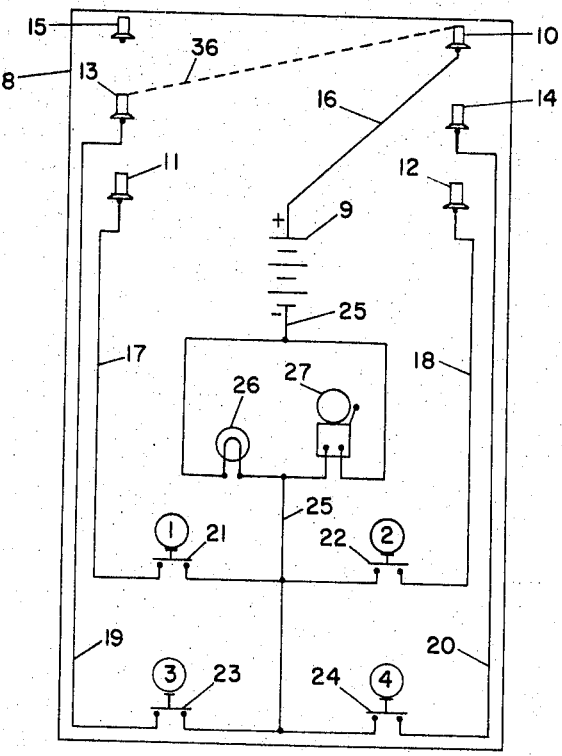
*Fig.1*
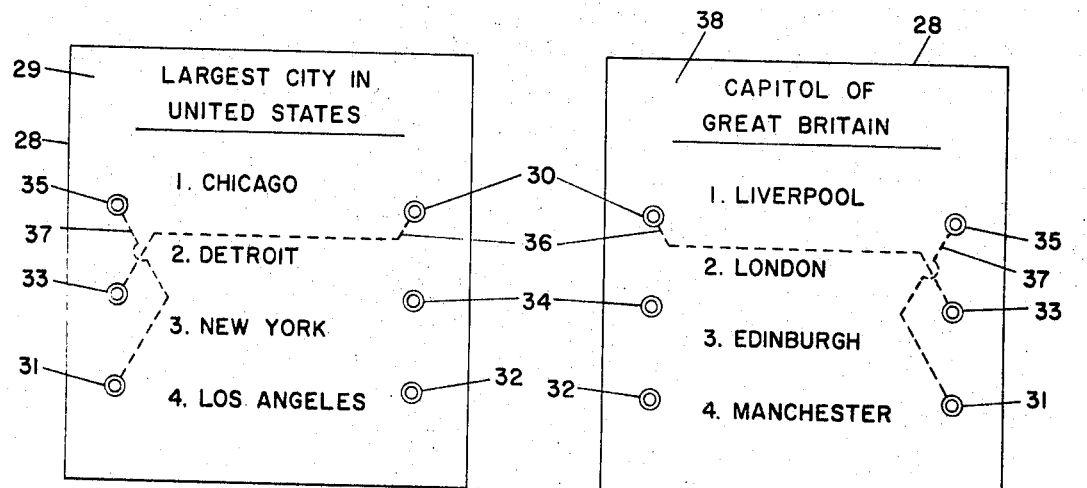
*Fig.2*   *Fig.3*
INVENTOR.
ROBERT E. AUMANN
BY
ATTORNEYS

United States Patent Office 3,477,143
Patented Nov. 11, 1969

3,477,143
ELECTRICAL TEACHING SYSTEM
Robert E. Aumann, Rte. 1, Iron Ridge, Wis. 53035
Filed Dec. 6, 1967, Ser. No. 688,402
Int. Cl. G09b 7/06
U.S. Cl. 35—9      4 Claims

ABSTRACT OF THE DISCLOSURE

An electrical teaching system including a selector device having a live terminal and a plurality of other terminals, a plurality of switches individually connected to the other terminals and to electrically activated indicator means, a question card having a plurality of electrical contacts removably engaged with the terminals of the selector device, an electrical conductor lead within the card selectively connecting the contact engaged with the live terminal and a contact engaged with another said terminal connected to one said switch, which lead completes a circuit when said switch is closed to activate the indicator means.

BACKGROUND OF THE INVENTION

Field of the invention

My invention relates to electrical educational systems, and more particularly to a selector device employing question cards which will complete a circuit when the correct selector switch is closed to activate indicator means.

Description of the prior art

Numerous electrically actuated systems have been developed for the purpose of teaching and testing students, as well as to provide an enjoyable and motivating method of study. Such systems enable one or two students, or in some cases groups of students to study and test themselves on an almost unlimited variety of subjects. Such systems can also be very effective in motivating children to study and learn, and are easily adapted for use in educational games, which can be a very effective teaching aid.

One type of system known to the prior art is designed for classroom use, wherein a question is projected on a screen, and the studetns' answers as selected at individual desk consoles are indicated and recorded on an instructors' console. Such a device, while being quite effective for classroom application, is much too complex and expensive for individual use, and cannot be transported to different locations.

Another device which has been developed is designed to receive questions and answer plaques. A series of question and answer cards can be inserted in sets of corresponding plaques. A question plaque is then placed in the machine and if the student places the corresponding plaque with the correct answer in the device a "correct" light will be activated. If the student selects the wrong plaque with the wrong answer card, a "wrong" light will be activated. The disadvantage of this system is that another person must first place the question and correct answer in corresponding plaques, and two plaques must be used for each answer.

Various other devices have been developed which employ question cards which can be inserted into the device and which permit a circuit to be closed when a button representing the correct answer is depressed. However, such devices have in the past employed cards from which the correct answer could be determined by observation before the card was placed in the device. Such devices obviously require at least two people to use them, and even then it may be difficult to conceal the question card from the student before it is placed in the machine.

SUMMARY OF THE INVENTION

I have invented an electrical teaching system wherein a series of question cards having hidden internal conductor leads may be placed on a selector device such that when a switch bearing indicia corresponding to the indicia identifying the correct answer on the card is closed a circuit is completed through the card to activate a light and buzzer or other indicator means. My system has the further advantage that the card may be turned over to present another question and choice of answers, with the correct answer being totally unrelated to the answer of the opposite side, either as to subject matter or relative position on the card. Neither correct answer can be discerned from the outward appearance of the card.

The exclusive and beneficial features of my system include: the construction of the cards, wherein all cards have an equal number of contact openings located in identical positions but which are selectively connected by hidden internal contact leads; and the construction of the selector device to permit a circuit to be completed through the card when a selector switch having indicia corresponding to indicia associated with the correct answer on the card is closed.

The selector device utilizes a live terminal which is connected to a source of electrical energy, a plurality of terminals each of which is connected to a normally open selector switch, and preferably a dead terminal having no electrical connection. The selector switches, in turn are all connected to electrically activated indicator means such as a buzzer, a light or both, and the source of electrical power. The terminals are spaced in a desired configuration. If the selector device employs a dead terminal, the terminals are spaced symmetrically about a longitudinal axis and the live and dead terminals should be symmetrically opposite each other.

Each card has a plurality of electrical contacts which are shaped and arranged to engage the terminals of the selector device which are connected to the selector switches. In addition, each card has a similar contact located to engage the live terminal of the selector device. If the device has a dead terminal, the card additionally has a similar contact for engaging the dead terminal. If the dead terminal is present, the card may be engaged on the terminals with either side of the card exposed. Thus the contact which engages the live terminal when one face of the card is exposed will engage the dead terminal when the opposite face is exposed, and vice versa. An internal conductor lead extends from each contact which will engage the live terminal in either card position to a selected contact which will engage a terminal connected to a selected switch. The correct answer for the question on the exposed face of the card will be the answer associated with the indicia corresponding to the indicia of the said connected switch. Closing of that switch thus completes the circuit through the card and activates the indicator means.

It is a principal object of my invention to provide a relatively simple and inexpensive electrical teaching system employing question cards which do not by their outward appearance reveal the correct answers, and a selector device which may be effectively used by a single individual.

Other objects and advantages of my invention will be readily apparent from the following detailed description taken in conjunction with the accompanying drawings wherein a preferred embodiment of the principles of the invention has been selected for exemplification.

BRIEF DESCRIPTION OF THE DRAWINGS

FIG. 1 is a circuit diagram of a selector device employed in my electrical teaching system.

FIG. 2 is a front view of a question card for use with my selector device.

FIG. 3 is a rear view of the question card of FIG. 2.

DESCRIPTION OF THE PREFERRED EMBODIMENT

Referring particularly to FIG. 1 of the drawings, wherein a preferred embodiment of the selector device of my invention is schematically shown, my selector device 8 preferably includes a battery 9, a live terminal 10 connected to the battery 9 by electrical power lead 16, terminal 11 connected to normally open selector switch 21 by conductor lead 17, terminal 12 connected to normally open selector switch 22 by conductor lead 18, terminal 13 connected to normally open selector switch 23 by conductor lead 19, terminal 14 connected to normally open selector switch 24 by conductor lead 20, and dead terminal 15 which has no electrical connection. Switches 21, 22, 23, and 24 are, in turn, connected to conductor lead 25 leading to the battery 9. Indicator means in the nature of incandescent lamp 26 and buzzer 27 are connected to electrical power lead 25 between said selector switches and said battery 9 in parallel relation, as shown. If only one such indicator means were preferred, a lamp or buzzer or other equivalent means could, of course, be located in series with the battery. Of course, an electrical outlet plug could be provided instead of the battery if desired. The terminals are arranged such that live terminal 10 and dead terminal 15 are symmetrically located opposite each other about an imaginary longitudinal axis. Likewise, terminals 11 and 12, and terminals 13 and 14 are in each case located symmetrically opposite each other about the same axis. The particular configuration of the terminal locations is immaterial, so long as it is symmetrical to permit the question card to be engaged with the terminals with either face exposed as will be described in more detail below.

In cooperation with the above described selector device 8, my system involves the use of one or more question cards 28, as illustrated in FIGS. 2 and 3. The illustrated question cards are seen to include an abbreviated question, with four numbered possible answers. Each card also includes six electrical contacts 30–35 which are arranged in the same spacial relationship as the terminals 10–15 of the selector device 8. Thus when the card 28 is engaged on the selector device 8 with the front face 29 illustrated in FIG. 2 exposed, contact 30 will engage live terminal 10, contact 31 will engage terminal 11, contact 32 will engage terminal 12, contact 33 will engage terminal 13, contact 34 will engage terminal 14, and contact 35 will engage dead terminal 15. The illustrated card 28 has a hidden conductor lead 36 extending between contact 30 and contact 33 as represented by the dotted line in FIGS. 2 and 3. The card additionally has a hidden conductor lead 37 extending between contact 35 and contact 31, which is also represented by a dotted line in the drawings. Contact leads 36 and 37 are insulated from each other by any suitable insulating material.

Use of my electrical teaching device is quite simple. The user first places the question card 28 on the selector device 8 so that the contacts 30–35, respectively, engage the upwardly extending terminals 10–15 in electrically conducting relation. Assuming that illustrated card 28 is being used with front face 29 exposed, the user examines the question and selects the answer from the possible choices numbered 1–4 on the card. If the user correctly determines that New York City is the largest city in the United States, he will close selector switch 23 which is numbered "3" on the selector device, as illustrated in FIG. 1, to correspond to the same number associated on the card with the answer, "New York." The closing of switch 23 will complete the circuit from the battery 9 through conductor lead 16, live terminal 10, card contact 30, hidden conductor lead 36, card contact 33, terminal 13, conductor lead 19, switch 23, conductor lead 25, incandescent lamp 26 and buzzer 27, and battery 9. Dotted line 36 in FIG. 1 represents the hidden conductor lead 36 on card 28 in the described circuit. Completion of the described circuit will cause the lamp 26 and buzzer 27 to be activated, thus indicating to the user he has selected the correct answer.

If, on the other hand, the user selects answers 1, 2, or 4 by closing switches 21, 22, or 24, numbered "1," "2," and "4," respectively, no circuit will be completed since the card provides no electrical conductor between live terminal 10 and either of terminals 11, 12, or 14. The user then will know that he has selected the wrong answer, and he will make other selections by closing other numbered switches until his selection of correct answer number "3" will activate the lamp 26 and buzzer 27. Consequently, in using my system, the user is not only testing his knowledge of a given subject matter, but is able to learn any correct answer which was previously unknown to him.

When the user decides to go on to the next question, he simply removes the card 28 from the device 8 and turns it over and again engages the card contacts on the terminals of the selector device 8 with the rear face 38 of the card exposed. In this position, contact 30, which previously engaged live terminal 10, is now in engagement with dead terminal 15, contact 31 is engaged with terminal 12, contact 32 is engaged with terminal 11, contact 33 is engaged with terminal 14, contact 34 is engaged with terminal 13, and contact 35 is engaged with live terminal 10. In this position, hidden conductor lead 36 does not complete a circuit within the selector device, since contact 30 at one end of conductor lead 36 is in contact with dead terminal 15, which has no electrical connections. However, conductor lead 37 is now in contact with live terminal 10 through contact 35, and provides an electrical connection between live terminal 10 and terminal 12 connected to normally open selection switch 22. If the user correctly selects London as the capitol of Great Britain, he will close switch 22, which is numbered "2," to complete the circuit from battery 9 through conductor lead 16, live terminal 10, contact 35, hidden conductor lead 37, contact 31, terminal 12, conductor lead 18, switch 22, conductor lead 25, lamp 26 and buzzer 27, to battery 9. The lamp and buzzer will thereby be activated, indicating to the user that he has selected the correct answer. If the user erroneously closes switches 21, 23, or 24, no circuit will be completed and the lamp and buzzer will not be activated, thus indicating that the user has selected the wrong answer.

It is obvious that the subject matter of my question cards is unlimited, and extends to any situation wherein questions with multiple choice answers can be employed. While the number of choices in the illustrated embodiment of my selector device and question card is four, the number of choices which may be provided by my system is theoretically unlimited, and depends only on practical considerations such as the number of choices desired, and the desired size and complexity of the teaching device and the question card. It is apparent from the drawings that any number of additional terminals and connected selector switches could be added to my selector device to provide the desired number of choices for the user. Likewise, additional electrical contacts could easily be added to the question cards for engagement with the additional terminals. However, a primary consideration is to avoid unnecessary complexity, which will increase system costs and in some cases may constitute a distraction from the subject matter during use. Therefore, for most purposes, systems employing four choices as illustrated are quite satisfactory.

It is understood that the present invention is not confined to the particular construction and arrangement of parts herein illustrated and described, but embraces all such modified forms thereof as may come within the scope of the following claims.

I claim:
1. An electrical teaching system comprising:
   (a) a selector device having a plurality of spaced terminals, a plurality of normally-open switches, electrical power lead means and indicator means,
   (b) said terminals including a live terminal electrically connected directly to said electrical power lead means and a plurality of other terminals which are each electrically connected to one said normally-open switch,
   (c) said switches each being electrically connected to said indicator means and said electrical power lead means,
   (d) a question card having a plurality of electrical contacts removably engaged with said terminals in electrically conductive relation, and
   (e) a hidden internal electrical conductor lead extending within said card from the contact engaging said live terminal to a selected contact engaging a said terminal electrically connected to one of said normally-open switches,
   (f) said internal conductor lead completing an electrical circuit when said electrical power lead means are connected to a source of electrical power such that the closing of said normally-open switch in said circuit will activate said indicator means.

2. The invention described in claim 1 wherein the indicator means includes an incandescent lamp and a buzzer connected in parallel between said normally-open switches and said power source.

3. The invention described in claim 1 wherein the card has an exposed face which carries a question and a plurality of possible answers equal in number to the number of said switches, only one of which answers is correct, and wherein corresponding identifying indicia are respectively carried by said switches and by said card adjacent to said answers such that the indicia adjacent to the correct answer is identical to the indicia carried by the switch in the circuit completed by the internal conductor within the card.

4. The invention described in claim 1 wherein the selector device includes an additional dead terminal having no electrical connection, and wherein all of the said terminals are spaced in symmetrical relation about a longitudinal axis such that the dead terminal and the live terminal are symmetrically opposite each other, and wherein each of the electrical contacts on said question card may be removably engaged with said terminals with either opposed face of said card exposed, and wherein a separate internal electrical conductor lead extends from each of the two contacts which alternately and oppositely engage the live terminal when one side of the card is exposed and the dead terminal when the opposite side of the card is exposed to selected contacts other than said two contacts, whereby one of said internal conductive leads completes a circuit when a selected switch in said circuit is closed while one face of the card is exposed, and the other internal conductive lead completes a circuit when a selected switch in said circuit is closed while the opposite face of the card is exposed.

References Cited
UNITED STATES PATENTS

| | | | |
|---|---|---|---|
| 2,997,793 | 8/1961 | Kelly | 35—9 |
| 3,122,843 | 3/1964 | Levine et al. | 35—9 |
| 3,137,079 | 6/1964 | Greuzard | 35—9 |
| 3,141,244 | 7/1964 | Smith | 35—9 |
| 3,187,442 | 6/1965 | Hertsche | 35—9 |
| 3,212,199 | 10/1965 | Clark | 35—9 |
| 3,252,230 | 5/1966 | Donev | 35—9 |
| 3,389,479 | 6/1968 | Gross | 35—9 |

EUGENE R. CAPOZIO, Primary Examiner

W. W. NIELSEN, Assistant Examiner